United States Patent
Voss

(10) Patent No.: US 10,717,869 B2
(45) Date of Patent: Jul. 21, 2020

(54) STABILISED FORMAZIN COMPOSITION, METHOD OF PREPARATION AND DILUENT FOR FORMAZIN COMPOSITION

(71) Applicant: TINTOMETER GMBH, Dortmund (DE)

(72) Inventor: Melanie J. Voss, Dortmund (DE)

(73) Assignee: TINTOMETER GMBH, Dortmund (DE)

( * ) Notice: Subject to any disclaimer, the term of this patent is extended or adjusted under 35 U.S.C. 154(b) by 81 days.

(21) Appl. No.: 16/068,730

(22) PCT Filed: Dec. 16, 2016

(86) PCT No.: PCT/EP2016/081467
§ 371 (c)(1),
(2) Date: Jul. 9, 2018

(87) PCT Pub. No.: WO2017/121575
PCT Pub. Date: Jul. 20, 2017

(65) Prior Publication Data
US 2019/0016890 A1      Jan. 17, 2019

(30) Foreign Application Priority Data

Jan. 11, 2016   (EP) .................................... 16150720

(51) Int. Cl.
| | | |
|---|---|---|
| *C08L 79/04* | (2006.01) | |
| *C08G 73/06* | (2006.01) | |
| *G01N 21/27* | (2006.01) | |
| *G01N 21/47* | (2006.01) | |
| *G01N 21/51* | (2006.01) | |
| *C08L 61/22* | (2006.01) | |
| *C08G 12/06* | (2006.01) | |

(52) U.S. Cl.
CPC .......... *C08L 79/04* (2013.01); *C08G 73/0683* (2013.01); *G01N 21/278* (2013.01); *G01N 21/4785* (2013.01); *G01N 21/51* (2013.01); *C08G 12/06* (2013.01); *C08L 61/22* (2013.01)

(58) Field of Classification Search
None
See application file for complete search history.

(56) References Cited

U.S. PATENT DOCUMENTS

| | | | |
|---|---|---|---|
| 4,816,145 A * | 3/1989 | Goudy, Jr. ................ | A61L 2/10 210/243 |
| 5,777,011 A | 7/1998 | Sadar | |
| 2016/0229979 A1* | 8/2016 | Katayama ................ | B09B 3/00 |

OTHER PUBLICATIONS

European Pharmacopoeia 7th Edition vol. 1, p. 493 (Year: 2010).*
Thorsten (CR Scientific LLC, Chemistry of Borate-Boric Acid Buffer System) (Year: 2013).*
PCT International Search Report and Written Opinion dated Mar. 23, 2017 in Application No. PCT/EP2016/081467, 13 pages.
Standard Methods for the Examination of Water and Wastewater, 13th Edition, 1971, pp. 349-356.

* cited by examiner

*Primary Examiner* — Robert T Butcher
(74) *Attorney, Agent, or Firm* — Dilworth IP, LLC

(57) ABSTRACT

A stabilised aqueous formazin composition comprises 100 parts by weight water; up to 0.03 parts by weight formazin polymer; 0.4 to 5 parts by weight hexamethylenetetramine; and a buffer composition, wherein the buffer composition is adjusted to maintain a pH of the formazin solution in a range between 8.4 and 10. The stabilised formazin composition has a turbidity of 400 NTU or less. A diluent for preparing the stabilised formazin composition from a formazin stock composition is provided, wherein the diluent comprises hexamethylenetetramine in a concentration of between 4 and 50 g/l and a buffer composition adjusted to a pH of the diluent in a range of from 8.4 to 10.

20 Claims, No Drawings

STABILISED FORMAZIN COMPOSITION, METHOD OF PREPARATION AND DILUENT FOR FORMAZIN COMPOSITION

FIELD OF THE INVENTION

This invention relates to stabilised formazin compositions which are used as standards in the measurement of turbidity of liquids. Specifically, the invention relates to a stabilised formazin composition having a long storage stability at low turbidites, a method of preparing the stabilised formazin composition, and a diluent for use in the preparation of the stabilised formazin composition.

BACKGROUND OF THE INVENTION

Turbidity measurement plays an important role as an indicator of water quality. In the 13th edition of Standard Methods for the Examination of Water and Wastewater (1971), the American Public Health Association and the American Water Works Association accepted formazin as the primary standard for turbidity. Therefore, instrument specific alternative calibration standards such as styrene divinylbenzene microspheres, latex suspensions or metal oxide gels must be traced to formazin. The U.S. Environmental Protection Agency also recognises formazin as the primary turbidity standard in methods for the Chemical Examination of Water and Wastes.

Formazin is an aqueous suspension of an insoluble white polymer formed by the condensation reaction between hydrazine sulfate and hexamethylenetetramine. However, formazin degrades quickly when diluted to workable turbidity values in the range of 0-100 NTU using ultra-low turbidity water. However, formazin maintains its turbidity value for one year at a concentration of 4000 NTU, where residual reactants and reaction intermediates such as hexamethylenetetramine and sulfate compose the polymer's matrix. Dilutions with ultra-low turbidity water diluting the polymer matrix of formazin may facilitate the degradation of the polymer.

The preparation of formazin, as outlined in ISO Standard 7027:1999, requires a solution of 10 g/l hydrazine sulfate and a solution of 100 g/l hexamethylenetetramine. The two solutions are mixed in equal volumes. A white polymer suspension forms while the mixture stands for 24 hours at 25° C. Upon 1:10 dilution with ultra-low turbidity water, the suspension has a turbidity of 400 Formazin Nephelometric Units (FNU) or Nephelometric Turbidity Units (NTU). Lower turbidity standards require a dilution of the stock 4000 NTU solution with ultra-low turbidity water, and are reproducible within ±2% of reading. A 400 NTU formazin composition remains stable for one month when stored in darkness at 25° C., but working standards of lower turbidity degrade after one week or less. Below 40 NTU, the standards must be used immediately after preparation because degradation occurs in a day or less. More dilute standards degrade most quickly.

U.S. Pat. No. 5,777,011 discloses a stabilised formazin composition suitable as a primary turbidity standard. The composition can be prepared by diluting an aqueous formazin stock composition having a turbidity of greater than 400 NTU with a diluent containing hexamethylenetetramine (hexamine) and, optionally, a water-soluble sulfate salt such as sodium sulfate. The pH of the stabilised composition shall be in the range of about 7 to 11. Specifically, hexamine is used in a concentration range of 50 to 200 g/l, or another base is added to increase the pH of the composition.

Although U.S. Pat. No. 5,777,011 claims that the stabilised formazin solutions having a turbidity of less than 400 NTU will remain stable for a period of more than one year, it was found that slow degradation may still take place at low NTU values. In addition, use of hexamine solutions having a concentration of more than 50 g/l can result in significant refractive index changes leading to irregular turbidity readings.

Accordingly, there remains a need for further diluents and stabilised formazin solutions having a turbidity of less than 400 NTU useful as a primary calibration standard in turbidity measurements.

SUMMARY OF THE PRESENT INVENTION

According to the present invention, this problem is solved by providing a stabilised formazin composition of claim 1 which is suitable for use as a turbidity calibration standard.

In a further object, the invention provides a method of preparing a stabilised formazin composition in accordance with claim 9, and a diluent for use in said method, in accordance with claim 16.

Other features and advantages of the present invention are apparent from the dependent claims which can be combined with each other, as it is technically feasible.

According to an aspect of the present invention, a stabilised aqueous formazin composition comprises 100 parts by weight of water; up to 0.03 parts by weight of formazin polymer; 0.4 to 5 parts by weight of hexamethylenetetramine; and a buffer composition, wherein the buffer composition is adjusted to maintain a pH of the formazin composition in a range from 8.4 to 10, preferably from 8.4 to 9. The stabilised formazin composition has a turbidity of 400 NTU or less.

To the inventor's surprise it was found that the stabilisation of formazin polymer requires that the pH of the formazin composition must not only be adjusted to a range where the polymer is stable, but that the pH of the solution itself must be stable over time. Although not wishing to be bound by theory, the inventor contemplates that carbon dioxide from the atmosphere can react with water to form carbonic acid. This may cause an eventual drop of pH resulting in destabilisation of the formazin polymer. It was found that a key to the stability of the formazin polymer is to prevent a pH shift, regardless of the pH of the formazin solution, even if the pH of the solution is greater than 7.5. If there is a pH shift of more than 0.5 units from basic to more acidic, the shift itself will generate enough free hydrogen ions to interact with the formazin polymer and causing the polymer to degrade. To remedy this problem, the invention suggests using a buffer system, such as a phosphate or borate buffer system, to adjust the pH of the formazin composition to a range from 8.4 to 10 which provides long-term stabilisation of the formazin polymer. Using the buffer system of the present invention for stabilising the formazin polymer facilitates the provision of formazin calibration standards that are stable at any turbidity down to 0.05 NTU for at least 12 to 18 months.

Unexpectedly, the invention also allows for reducing the hexamine concentration in the diluent down to about 4 g/l which eliminates refractive index changes that would otherwise cause dilution errors. Further, it is no longer necessary to use additional sulfate salts such as sodium sulfate in the diluent which simplifies the manufacture of the diluent and decreases the complexity of the solution. Reducing the amount of hexamine in the diluent also reduces toxicity to all forms of life and the environment, and the formazin composition is therefore lower in COD, BOD and TOC of the waste stream. The formazin compositions further exhibit a lower amount of residual formaldehyde due to the reduced amount of hexamine, thereby reducing the toxicity of any standard.

The formazin composition of the present invention satisfies all of the qualities which are desired in a primary turbidity standard. The standards produced from the stabilised formazin composition maintain the accuracy, repeatability and light scatter qualities of traditional formazin standards.

In addition, the formazin turbidity standards are prepared from readily available chemicals, and they require no matching to traditional formazin. Most importantly, the new standards remain stable for longer than one year at any turbidity and do not change colour, when stored in darkness at room temperature (25° C.).

The term "stable" or "stabilised" or "storage stability" means that the formazin turbidity standard stays within five percent of its original turbidity reading, or less than ±0.05 turbidity units for standards having about 1.0 NTU or less, during a particular time period, assuming that the standard is mixed before each use. The standard settles out of suspension just like traditional formazin and must be mixed by inversion before each use. The stability of the stabilised formazin composition allows for low turbidity formazin standards to be prepared commercially, thus eliminating direct exposure to the user.

"Degradation" refers to a decrease in the turbidity value of the standard, assuming that the standard is mixed before each use. Coagulation, which results from the hydrolysis of the formazin polymer, is the most likely cause of degradation. To ensure prolonged stability, all standards used in stability studies should be stored in sealed containers away from direct light exposure.

According to a preferred embodiment, the stabilised formazin composition comprises hexamethylenetetramine in an amount of 0.4 to 4 parts by weight, preferably 0.4 to less than 4 parts by weight, more preferably 0.4 to 3.5 parts by weight, and still more preferably 0.4 to 3 parts by weight.

Still more preferably, the stabilised formazin composition has a turbidity of 100 NTU or less and comprises up to about 0.0075 parts by weight of the formazin polymer, or may have a turbidity of 40 NTU or less and comprise up to about 0.003 parts by weight of formazin.

The buffer composition may be used in an amount such that it is effective to provide a buffer capacity of at least 1 percent, preferably 1 to 15 percent, more preferably 5 to 15 percent. The buffer capacity is defined as the moles of an acid or base necessary to change the pH of a solution by 1 unit, divided by the pH change and the buffer volume in litres. Since the buffer composition is provided to protect the formazin polymer against intake of carbon dioxide from the atmosphere, a low buffer capacity is sufficient to maintain the pH of the formazin composition over a long period of time.

Preferably, the stabilised formazin composition comprises the buffer composition in a concentration of 0.01 mold to 0.5 mol/l, preferably in a range from 0.01 to 0.4 mol/l, more preferably in a range of from 0.02 to 0.2 mol/l.

More preferably, the buffer composition is selected from the group of ammonium buffers such as tris(hydroxymethyl) aminomethane/HCl, barbitone buffers, glycin buffers, phosphate buffers and borate buffers, preferably phosphate buffers and borate buffers. These buffer compositions are commercially available alkaline buffer systems.

In a specific example, the buffer composition may comprise a dihydrogen phosphate salt and sodium hydroxide, or may comprise a borate salt and hydrogen chloride. The invention is however not limited to these examples. In fact, any alkaline buffer system which is capable to maintain a pH in a range from 8.4 to 10 can be used in accordance with the present invention.

More preferably, the pH of the stabilised formazin composition is adjusted to be in a range of from 8.4 to 9.5, preferably from 8.4 to 9.0.

In accordance with the present invention, a method for preparing a stabilised aqueous formazin composition having a turbidity of 400 NTU or less and a pH in the range of from 8.4 to 10 comprises the steps of: providing an aqueous diluent comprising hexamethylenetetramine in a concentration of between 4 and 50 g/l and a buffer composition adjusted to a pH of the diluent in a range from 8.4 to 10; and mixing the diluent with an aqueous formazin stock composition having a turbidity of greater than 400 NTU to obtain the stabilised aqueous formazin composition having a turbidity of less than 400 NTU.

According to the invention, the diluent solution used to prepare the stabilised formazin composition for use as a low turbidity calibration standard comprises hexamethylenetetramine in a concentration of between 4 and 50 g/l and a buffer composition adjusted to a pH of the diluent solution in a range from 8.4 to 10, preferably from 8.4 to 9.

More preferably, the hexamine concentration of the diluent solution is in a range from 4 to 40 g/l, preferably 4 to less than 40 g/l, more preferably 4 to 35 g/l, and still more preferably from 4 to 30 g/l. Because of the low concentration of hexamine in the diluent solution, the refraction index of the diluent solution matches that of water. Thus, when the diluent solution is used to prepare low turbidity formazin standards, the standards are exactly the same as if they had been prepared by diluting with water.

Still preferably, a conventional 4000 NTU formazin composition is used as the aqueous formazin stock composition to make stabilised low-turbidity standards by diluting with the diluent.

More preferably, the diluent solution is free of sulfate ions. This eliminates complexity from the diluent solution and facilitates the manufacture of stabilised formazin compositions for use as low turbidity standards.

The buffer composition in the diluent is the same as that in the stabilised formazin composition of the present invention. Since the diluent is used in great excess as compared to the formazin stock composition, the amount and concentration of the buffer composition in the stabilised formazin composition described above substantially correspond to the amount and concentration of the buffer composition in the diluent.

According to a preferred embodiment, the diluent solution is disinfected by exposure to ultraviolet (UV) radiation prior to packaging or adding the diluent to the formazin standard stock composition. UV disinfection eliminates growth of organisms that may otherwise cause a degradation of the formazin polymer.

Dilution techniques, glass cleaning techniques and low turbidity water preparation are generally known to the person skilled in the art such as from ISO 7027 or ASTM D6855. Generally, all reagents used are of analytical purity or higher, and all solutions are filtered through a 0.2 µm filter prior to use.

Other advantages of the techniques of this invention will be apparent from the following detailed description.

DETAILED DESCRIPTION OF THE INVENTION

The invention is described in more detail hereinafter with reference to preferred embodiments which are understood as non-limiting examples illustrating the invention.

Diluted formazin calibration standards can be made by diluting a concentrated 4000 NTU formazin stock solution made according to ISO 7027:1999 to ensure accuracy. 4000 NTU formazin stock solutions are also commercially available. In all cases, the reagents used to make formazin (hexamethylenetetramine and hydrazine sulfate), are primary standard grade reagents (assayed>99%).

The reagent water used in all testing is tap water passed through ion exchange columns and then through a reverse osmosis filter. The reagent water has a turbidity of 0.025 NTU or less. The reagent water is also referred to as ultra-low turbidity water.

Twenty-five millilitres of the concentrated 4000 NTU formazin stock composition are diluted to 250 millilitres using an aqueous diluent comprising hexamethylenetetramine to obtain a 400 NTU stabilised formazin composition. The diluent is an aqueous solution containing 4 g/l hexamethylenetetramine and a buffer composition comprising sodium tetraborate and hydrogen chloride. The pH of the diluent is adjusted to a pH of between 8.4 and 9. The molar concentration of the buffer in the diluent may vary in a range of from 0.01 mol/l to 0.5 mold.

The diluent may be filtered to low turbidity through a 0.2 µm filter before use. After filtering, the diluent shall have a turbidity of less than 0.06 NTU, or it should be re-filtered. Lower turbidity standards can be obtained by volumetric linear dilution of the 4000 NTU formazin stock solution with filtered diluent. For example, a 40 NTU formazin standard is obtained by diluting 2.0 ml of the 4000 NTU formazin stock solution to 200 ml, and a 4 NTU formazin standard can be obtained by diluting 1.0 ml of the 4000 NTU formazin stock solution to 1000 ml. Stabilised formazin standards remain stable for longer than one year, even at low turbidity levels of less than 0.5 NTU.

EXAMPLE 1

A formazin stock composition (4000 NTU) is prepared according to ISO 7027 having the following ingredients in the amounts shown. Unless stated otherwise, all amounts in the examples are given in weight percent.

| | |
|---|---|
| Formazin polymer | 0.21573% |
| Formaldehyde | 0.11539% |
| Ammonium sulfate | 0.50800% |
| Hexamine | 4.73100% |
| Water | 94.49300% |

EXAMPLE 2

A diluent solution is prepared by adding 20 g of analytically pure hexamine to 1 l of ultra-low turbidity water. A buffer composition comprising potassium dihydrogen phosphate in an amount of 13.6 g and 10.0 N sodium hydroxide in an amount of 9.22 ml is added to the hexamine solution and adjusted to a pH of 8.4. The solution is filtered through a 0.2 µm filter, and disinfected by exposure to UV light at a wavelength of between 240 to 280 nm and at a UV dose of between 2 and 60 mJ/cm$^2$. The solution is then diluted to 2 l using ultra-low turbidity water to obtain a diluent having an hexamine concentration of 10 g/l.

EXAMPLE 3

A stabilised formazin composition (400 NTU) is prepared by means of a linear 1:10 dilution of the formazin stock composition of Example 1 (4000 NTU) with the diluent solution of Example 2.

The pH of the composition is adjusted to 8.4. The storage stability of the formazin composition at 25° C. is longer than 12 months.

EXAMPLE 4

A stabilised formazin composition (40 NTU) is prepared by a 1:10 dilution of the 400 NTU stabilised composition of Example 3 using the diluent solution of Example 2.

The pH of the composition is adjusted to 8.4. The storage stability of the formazin composition is longer than one year.

EXAMPLE 5

A diluent solution containing 10 g/l hexamine was prepared according to Example 2. The pH of the diluent solution was adjusted to 8.5. A stabilised formazin solution was prepared by linear dilution of a 4000 NTU stock solution of Example 1 to the desired NTU value varying from 200 NTU to 0.32 NTU.

The stabilized formazin solutions were stored in glass vials in the dark at 85° C. for a predetermined period of time. After that time, they were allowed to cool down to room temperature (about 20° C.) prior to measurements. Turbidity measurements were taken from the solutions after mixing by inversion using a commercial turbiditmeter calibrated on fresh prepared formazin standards. Experimental data shows that one day of storage at 85° C. correlates to 4.25 days of stability at 20° C.

The results of the above accelerated stability tests are given in Table 1 wherein "Time (Days)" refers to calculated time at room temperature.

TABLE 1

| Accelerated Stability - 10 g/l hexamine in phosphate buffer | | | | |
|---|---|---|---|---|
| Time (Days; | | Standard Value (NTU) | | |
| calculated) | 200 | 20.5 | 1.05 | 0.32 |
| 2 | 202.833 | 20.203 | 1.041 | 0.349 |
| 9 | 201.361 | 20.136 | 1.033 | 0.350 |
| 28 | 201.306 | 19.967 | 1.013 | 0.352 |
| 59 | 201.556 | 19.936 | 1.007 | 0.345 |
| 66 | 201.111 | 19.942 | 1.005 | 0.344 |
| 84 | 200.917 | 19.958 | 1.015 | 0.351 |
| 126 | 201.861 | 20.297 | 1.036 | 0.360 |
| 427 | 199.389 | 20.194 | 1.064 | 0.374 |
| Time (Days; calculated) | % Chg 200 | % Chg 20.5 | % Chg 1.05 | % Chg 0.32 |
| 2 | 0.00 | 0.00 | 0.00 | 0.00 |
| 9 | −0.73 | −0.33 | −0.84 | 0.25 |
| 28 | −0.75 | −1.17 | −2.75 | 0.77 |
| 59 | −0.63 | −1.32 | −3.33 | −1.19 |
| 66 | −0.85 | −1.29 | −3.48 | −1.58 |
| 84 | −0.94 | −1.21 | −2.54 | 0.49 |

TABLE 1-continued

Accelerated Stability - 10 g/l hexamine in phosphate buffer

| | | | | |
|---|---|---|---|---|
| 126 | −0.48 | 0.47 | −0.50 | 3.15 |
| 427 | −1.70 | −0.04 | 2.17 | 7.21 |

The standard formazin solutions are considered stable if the change in the NTU values is less than 5 percent for all standard solutions greater than 1 NTU, or if the net change is less than 0.05 NTU for all standard solutions of 1 NTU or less.

EXAMPLE 5

A buffer composition was prepared by dissolving 4.765 g of sodium tetraborate decahydrate in 150 ml of filtered (0.02 µm), deionized water and adding 11.6 ml of 1.0 N hydrogen chloride (HCl). 4 g of analytically pure (99.95%) hexamine was added to the buffer composition, and the solution was diluted to 1 litre. The pH of the solution was adjusted to between 8.5 and 9.0, thus obtaining a diluent solution having an hexamine concentration of 4 g/l. Prior to use, the diluent solution was filtered through a 0.2 µm filter, and disinfected by exposure to UV light at a wavelength of between 240 to 280 nm and at a UV dose of between 2 and 60 mJ/cm².

The diluent solution was used to prepare a stabilised formazin solution by linear dilution of a 4000 NTU stock solution of Example 1 to obtain formazin standard solutions having the desired NTU value varying from 200 NTU to 0.44 NTU.

Accelerated stability tests were carried out with the formazin standard solutions as described in Example 4. The results of the accelerated stability tests are given in Table 2.

TABLE 2

Accelerated Stability - 4 g/l hexamine in borate buffer

| Time (Days; calculated) | Standard Value (NTU) | | | | |
|---|---|---|---|---|---|
| | 200 | 20.10 | 1.02 | 0.77 | 0.44 |
| 1 | 202.33 | 20.16 | 1.01 | 0.77 | 0.43 |
| 5 | 201.69 | 20.08 | 1.02 | | 0.44 |
| 17 | 202.64 | 19.97 | 1.03 | | 0.43 |
| 20 | | | | 0.77 | |
| 26 | 201.17 | 20.02 | 1.02 | | 0.44 |
| 34 | | | | 0.76 | |
| 41 | 202.72 | 19.99 | 1.03 | | 0.44 |
| 68 | 200.53 | 19.93 | 1.01 | | 0.43 |
| 61 | | | | 0.76 | |
| 83 | 201.78 | 19.90 | 1.01 | | 0.43 |
| 76 | | | | 0.76 | |
| 115 | 193.69 | 19.51 | 1.00 | | 0.42 |
| 108 | | | | 0.74 | |
| 128 | | | | 0.74 | |
| 135 | 195.47 | 19.54 | 1.00 | | 0.42 |
| 150 | 194.81 | 19.45 | 0.99 | | 0.41 |
| 145 | | | | 0.74 | |
| 239 | 193.44 | 19.26 | 0.97 | 0.72 | 0.40 |
| 280 | 193.42 | 19.03 | 0.94 | 0.71 | 0.40 |
| 293 | 193.94 | 19.08 | 0.97 | 0.72 | 0.41 |
| 313 | 193.69 | 19.00 | 0.96 | 0.71 | 0.40 |
| 355 | 192.53 | 19.34 | 0.98 | 0.73 | 0.41 |
| 375 | 194.17 | 19.34 | 0.98 | 0.73 | 0.41 |
| 677 | 192.78 | 19.12 | 0.96 | 0.71 | 0.40 |

TABLE 2-continued

Accelerated Stability - 4 g/l hexamine in borate buffer

| | Standard Value (NTU) | | | | |
|---|---|---|---|---|---|
| | 200 | 20.10 | 1.02 | 0.77 | 0.44 |
| Time (Days) | % Chg 200 | % Chg 20.1 | % Chg 1.02 | % Chg 0.77 | % Chg 0.44 |
| 1 | 0.000 | 0.000 | 0.000 | 0.000 | 0.000 |
| 5 | −0.316 | −0.372 | 0.859 | | 0.991 |
| 17 | 0.151 | −0.951 | 1.365 | | −1.267 |
| 20 | | | | 0.004 | |
| 34 | | | | −0.134 | |
| 41 | 0.192 | −0.841 | 1.557 | | 0.576 |
| 68 | −0.892 | −1.116 | −0.198 | | −1.708 |
| 61 | | | | −1.215 | |
| 83 | −0.275 | −1.295 | 0.129 | | −1.068 |
| 76 | | | | −1.223 | |
| 115 | −4.270 | −3.237 | −1.386 | | −3.761 |
| 108 | | | | −3.142 | |
| 128 | | | | −3.559 | |
| 135 | −3.391 | −3.045 | −1.444 | | −3.883 |
| 150 | −3.720 | −3.528 | −1.875 | | −4.740 |
| 145 | | | | −3.370 | |
| 239 | −4.393 | −4.437 | −3.657 | −6.204 | −6.979 |
| 280 | −4.407 | −5.581 | −6.924 | −6.900 | −7.350 |
| 293 | −4.146 | −5.333 | −4.360 | −6.082 | −5.815 |
| 313 | −4.270 | −5.760 | −5.590 | −7.131 | −8.827 |
| 355 | −4.846 | −4.051 | −3.468 | −4.750 | −5.444 |
| 375 | −4.036 | −4.065 | −3.124 | −5.089 | −4.817 |
| 677 | −4.723 | −5.167 | −4.676 | −7.566 | −7.503 |

The standard formazin solutions are considered stable if the change in the NTU values is less than 5 percent for all standard solutions greater than 1 NTU, or if the net change is less than 0.05 NTU for all standard solutions of 1 NTU or less.

The invention claimed is:

1. A stabilised aqueous formazin composition having a turbidity of 400 NTU or less, said composition comprising:
   100 parts by weight water;
   up to 0.03 parts by weight formazin polymer;
   0.4 to 5 parts by weight hexamethylenetetramine; and
   a buffer composition,
   wherein the buffer composition is adjusted to a pH of the formazin composition in a range of from 8.4 to 10.

2. The composition of claim 1, wherein said hexamethylenetetramine is present in an amount of 0.4 to 4 parts by weight.

3. The composition of claim 1 wherein the buffer composition is selected from the group consisting of ammonium buffers, phosphate buffers and borate buffers.

4. The composition of claim 3 wherein the buffer composition comprises a dihydrogen phosphate salt and sodium hydroxide.

5. The composition of claim 3 wherein the buffer composition comprises a borate salt and hydrogen chloride.

6. The composition of claim 1 wherein the buffer composition is present in a concentration effective to provide a buffer capacity of at least 1 percent.

7. The composition of claim 1 wherein the formazin composition has a buffer capacity of 1 to 15 percent.

8. The composition of claim 1 wherein the formazin composition has a turbidity of 100 NTU or less, and comprises up to about 0.0075 parts by weight of the formazin polymer.

9. A method for preparing a stabilised aqueous formazin composition having a turbidity of 400 NTU or less and a pH in the range of from 8.4 to 10, comprising the steps of:

providing an aqueous diluent comprising hexamethylenetetramine in a concentration of between 4 and 50 g/l and a buffer composition adjusted to a pH of the diluent in a range of from 8.4 to 10; and mixing the diluent to an aqueous formazin stock composition having a turbidity of greater than 400 NTU, to obtain the stabilised aqueous formazin composition having an NTU of 400 or less.

10. The method of claim 9, wherein the diluent is free of sulfate ions.

11. The method of claim 9 wherein the buffer composition is selected from the group consisting of ammonium buffers, phosphate buffers and borate buffers.

12. The method of claim 11 wherein the buffer composition comprises a dihydrogen phosphate salt and an alkali metal hydroxide.

13. The method of claim 11 wherein the buffer composition comprises a borate salt and hydrogen chloride.

14. The method of claim 9 wherein the diluent has a buffer capacity of 1 to 15 percent.

15. The method of claim 9 wherein the formazin composition is exposed to UV radiation for disinfection.

16. A diluent solution comprising hexamethylenetetramine in a concentration of between 4 and 50 g/l and a buffer composition adjusted to a pH of the diluent solution in a range of from 8.4 to 10.

17. The composition of claim 1 where the buffer composition is adjusted to the pH of the formazin composition in the range of from 8.4 to 9.

18. The composition of claim 2, wherein the hexamethylenetetramine is present in the amount of 0.4 to 3 parts by weight.

19. The process of claim 9 wherein the buffer composition is adjusted to the pH of the diluent in the range of from 8.4 to 9.

20. The diluent solution of claim 16 wherein the buffer composition is adjusted to the pH of the diluent solution in the range of from 8.4 to 9.

* * * * *